United States Patent [19]

Hill et al.

[11] 4,424,991

[45] Jan. 10, 1984

[54] COMPOSITE CONNECTOR

[75] Inventors: Frederick W. L. Hill, Lechlade; Robin J. T. Clabburn, Highworth, both of England

[73] Assignee: Raychem Limited, London, England

[21] Appl. No.: 297,718

[22] Filed: Aug. 31, 1981

Related U.S. Application Data

[60] Division of Ser. No. 964,850, Nov. 27, 1978, Pat. No. 4,309,807, which is a continuation of Ser. No. 742,562, Nov. 17, 1976, abandoned, which is a continuation-in-part of Ser. No. 741,523, Nov. 12, 1976, abandoned.

[30] Foreign Application Priority Data

Nov. 17, 1975 [GB] United Kingdom ............... 47252/75

[51] Int. Cl.³ .......................................... F16L 25/00
[52] U.S. Cl. ..................................... 285/381; 285/417
[58] Field of Search ............... 285/381, 383, 382, 417, 285/397, 370; 24/447

[56] References Cited

U.S. PATENT DOCUMENTS

| | | | |
|---|---|---|---|
| 418,752 | 1/1890 | Rogers | 285/381 |
| 2,917,822 | 12/1959 | Boice | 29/447 |
| 3,139,468 | 6/1964 | Wheat | 264/230 |
| 3,262,719 | 7/1966 | Gemma | 285/381 X |
| 3,498,648 | 3/1970 | Hallesy | 285/417 X |
| 3,513,429 | 5/1970 | Helsop | 174/DIG. 8 |
| 3,579,805 | 5/1971 | Kast | 29/447 |
| 3,740,839 | 6/1973 | Ott et al. | 29/447 X |
| 3,872,573 | 3/1975 | Nichols et al. | 29/447 |
| 3,888,523 | 6/1975 | Bartholomew | 285/382 |
| 3,975,034 | 8/1976 | Penneck et al. | 285/381 X |
| 4,035,007 | 7/1977 | Harrison et al. | 285/381 |
| 4,070,044 | 1/1978 | Carrow | 285/381 X |

FOREIGN PATENT DOCUMENTS

| | | | |
|---|---|---|---|
| 791491 | 9/1935 | France | 285/417 |
| 447094 | 5/1936 | United Kingdom . | |
| 1126711 | 9/1968 | United Kingdom . | |
| 1167779 | 10/1969 | United Kingdom . | |
| 1232741 | 5/1971 | United Kingdom | 285/381 |

Primary Examiner—Dave W. Arola
Attorney, Agent, or Firm—Lyon & Lyon

[57] ABSTRACT

The substantial change in modulus with temperature of certain materials, especially memory metals, is used to make a novel connector by forcing a band made from such a material in its low modulus state up an external tapered portion of a tubular coupling member so as to deform the band which remains in position about the coupling member. To make a connection one or more substrates is(are) positioned inside the tubular coupling member and the band is brought to its high modulus state whereupon it contracts and deforms the tubular coupling member and forces it into firm connection with the substrate.

16 Claims, 8 Drawing Figures

COMPOSITE CONNECTOR

This application is a division of application Ser. No. 964,850, filed Nov. 27, 1978, now U.S. Pat. No. 4,309,807 issued Jan. 12, 1982, which is a continuation of application Ser. No. 742,562, filed Nov. 17, 1976, now abandoned, which is in turn a continuation-in-part of application Ser. No. 741,523, filed Nov. 12, 1976, now abandoned. Application Ser. No. 741,523 claims priority under 35 U.S.C. 119 from British application No. 47,252/75, filed on Nov. 17, 1975.

BACKGROUND TO THE INVENTION

This invention relates to connectors, especially coupling members for substrates such as pipes.

The pipes used in central heating systems are generally coupled by traditional methods such as brazing. Similar methods are also employed in, for example, the coupling of larger pipes such as those used for desert irrigation. Apart from obvious disadvantages, such as the time required to make each connection, the need for skilled operators and the need to provide suitable equipment at the area of operation, these methods have the further disadvantage of placing a limitation on the choice of material used for the pipes. For example, brazing cannot be satisfactory employed with aluminum pipes.

It has been proposed to make coupling members from heat-recoverable materials. For example, U.S. Pat. No. 3,315,986 proposes the use of heat-shrinkable plastics materials in the coupling of hose pipes and British Pat. No. 1,327,441 proposes the use of heat-shrinkable, internally toothed, metal coupling members for the connection of hydraulic pipes. However, unless special measures are taken, the connections obtained with heat-shrinkable plastics materials are, in general, unable to withstand high internal pressures and cannot reliably provide a long term seal against the egress of, for example, liquids flowing through the pipes, and the alloys used in the heat-shrinkable metal coupling members are too expensive to warrant their use in anything but specialized applications.

BRIEF SUMMARY OF THE INVENTION

The present invention provides a method of making a connector which comprises the steps of:

(a) providing a tubular member at least a portion of which has a tapered outer surface;

(b) providing at least one band made from a material which exhibits a relatively low modulus at a first temperature and a relatively high modulus at a second temperature; and (c) positioning said band about the narrower end of the tapered surface of the tubular member and forcing said band at said first temperature along and against the taper so as to expand it, the relatively high modulus of the material of said band being such that when the band is brought to said second temperature it will contract and deform the tubular member.

The present invention also provides a connector made by the above method, which comprises a tubular member, at least a portion of which has a tapered outer surface, and, positioned about said tubular member away from the narrower end of said taper, a band made from a material which exhibits a relatively low modulus at a first temperature and relatively high modulus at a second temperature, said band being capable of contracting on being brought to said second temperature and deforming the tubular member.

The present invention also provides a method of making a connection to at least one substrate which comprises placing said substrate within a connector as described above and then bringing the band to the second temperature so that it contracts and forces the tubular member into firm connection with the substrate.

The present invention utilises the significant change in the modulus of certain materials as the temperature is varied and uses the relative change in the strength of a band made from such a material so that, on the one hand, it can be deformed by using the tapered outer surface of the tubular member as a mandrel when the material is in its low-modulus state and yet so that it can, on the other hand, force and/or deform the tubular member so as to form a connection with a substrate positioned within said member when the material is in its high-modulus state.

In general it will be preferred for the material used to form the band to exhibit a substantial change in modulus on passing through a transition temperature or through a relatively small temperature range as this enables the connections to be made more rapidly and also ensures that the strength of the connection once made, will not alter significantly so long as the temperature does not return to the relevant transition temperature (or range).

Amongst materials suitable for making the band there may be mentioned certain plastics materials, especially so-called "engineering plastics" such as the polyarylenes sold under the trade mark "Stilan" by Raychem Corporation. The polyarylenes are polymers consisting predominantly of aryl, e.g. phenyl or substituted phenyl, groups which may be linked, for example, by direct linkages or by alkylene, carbonyl, sulphonyl or ether linkages or mixtures of the above linkages. Preferred polarylenes are described in Belgian Pat. Nos. 779,457; 779,458 and 779,459. These materials may have a highly crystalline nature and, even without cross-linking, can be deformed at room temperature and yet still have sufficient elastic memory to return to their original configuration upon heating. Alternatively, they may be deformed at an elevated temperature and then allowed to cool and contract. Other engineering plastics such as polyketones, polysulphones and polyphenylene sulphides may also be used. Conventional heat-recoverable plastics materials, e.g. cross-linked polyethylene may also be employed in certain applications.

However, especially suitable materials for use in the present invention are "memory metals". By a "memory metal" there is herein meant a metallic material from which a heat recoverable article can be made, that is, an article which can be deformed from an original heat-stable configuration to a different heat-unstable configuration in which it will remain until raised above a temperature known as the transition temperature when it will return or attempt to return towards its original configuration. It will be understood that the heat-recoverable article is capable of returning towards its original configuration without the further application of outside force.

Amongst such memory metals there may especially be mentioned various alloys of titanium and nickel which are described, for example in U.S. Pat. Nos. 3,174,851, 3,351,463, 3,753,700, 3,759,552, British Pat. Nos. 1,327,441 and 1,327,442 and NASA Publication SP 110, "55-Nitinol-The Alloy with a Memory, etc." (U.S. Government Printing Office, Washington, D.C. 1972).

The property of heat-recoverability has not, however, been solely confined to such titanium-nickel alloys. Thus, for example, various beta-brass alloys have been demonstrated to exhibit this property in, e.g. N. Nakanishi et al, *Scripta Metallurgica* 5, 443–440 (Pergamon Press 1971) and such materials may be doped to lower their transition temperatures to cryogenic regimes by known techniques. Similarly, 304 stainless steels have been shown to enjoy such characteristic E. Enami et al, id at pp. 663–68.

In general these metals have a transition temperature within the range of from $-196°$ C. to $+135°$ C., especially from $-196°$ C. to $-70°$ C. (this being the lowest temperature they are liable to encounter during everyday use), and thus may be brought into their martensitic state by immersion in liquid nitrogen. However, more recently, it has been found possible to "precondition" memory metals so as transiently to raise their transition temperature. This enables the articles made from such alloys to be kept at room temperature prior to use, when they can be recovered by heating. Such preconditioning methods, which eliminate the need for liquid nitrogen during storage and transportation, are described, for example, in U.S. patent application Ser. No. 417,067 filed Nov. 19, 1973, now abandoned, by G. B. Brooks and R. F. Iles and in U.S. patent applications filed Feb. 18, 1975, by the same inventors, entitled "Heat Treating Method" (Ser. No. 550,847, now abandoned) "Mechanical Preconditioning Method" (Ser. No. 550,555, now U.S. Pat. No. 4,036,669, issued July 19, 1977) and "Austenitic Ageing of Metallic Compositions" (Ser. No. 550,556, now U.S. Pat. No. 4,067,752, issued Jan. 10, 1978).

The band made, for example, from the memory metal is preferably a continuous ring, but it should be appreciated that the band may be split and/or may have a non-circular cross-section.

Similarly it should be appreciated that the terms "tubular member" and "tube" as used herein are not limited simply to continuous tubes of circular cross-section, but are intended to cover tubes of other regular or irregular cross-sectional form as well as tubes which may exhibit discontinuities, i.e. which may be longitudinally or otherwise split, and member of, for example, T-, Y- or X-shape. The terms are also used herein to include closed tubes, i.e. those having at least one end which is not open.

In the preferred forms of connector according to the present invention, the ends of the tubular member are externally tapered, peferably so that the narrower portion lies toward the open end of the tube and the wider portion is remote from the open end of the tube. In such embodiments the bands will be initially positioned at the open ends and will be pushed up towards the central portion of the tubular member to deform them. It may be advantageous to provide means at the central portion of the tubular member to ensure proper positioning of the bands after they have been forced up the taper and to prevent the bands from being pushed further than desired. Such means may, for example, be provided by a shoulder formed on the external surface of the tubular member. Alternatively a separate positioning member may be provided which is itself positioned on the tubular member by engaging a groove and/or protuberance on the external surface of the tubular member.

In other embodiments of the present invention, the or each end of the tubular member is tapered so that the narrower portion lies away from the open end. In such embodiments the band or band will initially be placed over the central portion of the tubular member and will be forced up the tapered portion(s) towards the open end(s). Again, the tubular member is preferably provided with means for properly positioning the band(s) after deformation and, in this case, to prevent the band(s) from being forced off the end(s) of the member.

The inner surface of the band may be contoured, e.g. may have one or more of its edges curved, so as to facilitate its movement up the taper. For example the band may be formed as a ring of circular cross-section thus enabling it, in some cases, to be rolled up the taper, e.g. like an elastic band. In other embodiments it may also be advantageous to provide the inner surface of the band and/or the outer surface of the tubular member with screw threading to assist movement of the band up the taper during expansion. In some cases it may also be advantageous to provide the inner surface of the band and/or the outer tapered surface of the tubular member with a suitable lubricant.

The preferred angle of the tapered portion(s) will depend on the materials employed and the application concerned. In some cases, angles of 30° and higher may be appropriate, thus allowing the length of the connector to be kept small. However, in general, angles of not greater than 5° will be used, angles of between 1° and 2° being especially suitable.

The maximum amount of thermally recoverable dimensional deformation which can currently be obtained with memory metals is about 8%. Up to a strain of about 8% the memory metal deforms easily and the main forces encountered in moving a band up a tapered portion are frictional. Above 8% it becomes extremely difficult further to deform the band of memory metal. This fact can be used to advantage in the connectors of the present invention. Suppose, for example that the wider end of the tapered portion corresponds to a deformation of 12% in the band, then upon forcing the band up the taper it will easily expand up to about 8%, at which stage it will have moved along about ⅔ of the taper. When further force is applied to the band in an endeavor to force it up the taper, the effect (assuming that the tubular member is made from a relatively soft material) will be such that force will cause a crushing of the tubular member and, possibly, the substrate with little or no further expansion of the band. This crushing will take up any clearance between the bore of the tubular member and the substrate and, possibly, will even slightly crush the substrate. Thus, virtually all of the 8% recovery will still be available to produce an annular indentation in the substrate upon heating and the need for accurate dimensioning of the connector in relation to the substrate, is, in such a case, considerably reduced. Thus it may, in some cases, be advantageous to form the tapered portion(s) of the tubular member in such a way that the bands cannot be forced completely to the end of the tapered portions, at least without causing some deformation of the tubular member itself.

It will be apparent that the tubular member must be made from a material with suitable strength characteristics having regard to the strength of the band of, for example, the memory metal. Thus, in most embodiments of the present invention, the tubular member must be made from such a material that, and must be so constructed that, it will be sufficiently strong to act as a mandrel and deform the band when the material of the latter is in its low-modulus state and yet will itself be deformed when the material assumes its high-modulus state. In this respect it may, in some cases, be advantageous to alter the structure of the tubular member after the band(s) have been forced up the tapered portions and deformed. For example, an initially thick-walled tubular coupling member may be bored out after the bands have been forced up the tapered portions into position to produce a relatively thin-walled member which will be deformed upon recovery of the bands.

It will in general be preferred that the connector is formed in a manner such that it can be stored and transported prior to use. This may be achieved, for example, in the case of memory metals, by forming, storing and transporting the connector in a suitable coolant, e.g. liquid nitrogen, or more especially by 'preconditioning' the memory metal as described above. Thus, for example, in one especially preferred embodiment of the present invention a connector is prepared as follows: a tubular member in the form of a simple tube with two end portions which taper towards the open ends of the tube is prepared having a smaller bore than that which will finally be required. Two memory metal rings are positioned at each end of the tube and the assembly is cooled to below the transition temperature of the memory metal whereupon the rings are forced up the tapered portions towards a central position. The assembly is then allowed to warm above the transition temperature of the memory metal whereupon the thick-walled tubular member continues to act as a mandrel because its thick walls are too strong to be crushed by the metal rings as the memory metal assumes its austenitic state. This leads to a "preconditioning" of the memory metal rings and the tubular member may now be bored out to produce a thin-walled member of the desired bore (it may be necessary to use a coolant to prevent heating the memory metal rings to above their effective transition temperature during boring). The connector thus produced can be stored and transported at ambient temperature. In use the ends of the substrates, e.g. pipes, to be connected are simply inserted into the open ends of the thin-walled tubular member and the whole assembly is then heated to above the effective transition temperature of the preconditioned memory metal whereupon the two metal bands shrink and deform and force the tubular insert member into secure connection with the pipes, the pipes themselves possibly being deformed in the process. Other modifications can, of course, be employed to enable the tubular member to act both as a mandrel and, later, as a deformable insert, for example the tubular member may comprise at least one relatively rigid part to act as the mandrel and at least one other, relatively, deformable, part.

Conventional heat-shrinkable plastics materials, such as cross-linked polyethylene, may be used in a similar way to that described above for the preconditioned memory metals. In certain applications of the present invention it may be advantageous for one or more of the bands to be partially prestressed and deformed.

In other embodiments of the present invention it may be desirable to form the connector in situ, for example the substrate to be connected can be placed within the tubular member with the bands positioned at the narrower ends of the tapers and the assembly can then be cooled, for example by immersion in, or by spraying with, liquid nitrogen whereupon the bands can be pushed up the tapers to deform them. When the bands are properly positioned in their deformed state the assembly is allowed to warm whereupon the bands contract and form the desired connection.

In other embodiments of the present invention the tubular member may be constructed so as to be considerably deformed as a band is pushed up the taper so that it is effectively pushed into contact with the substrate during deformation. In such cases it may be appropriate to provide a relatively deformable substrate such as a pipe with a rigid liner to ensure that some deformation of the band occurs (of course the deformation need not be so high as 8%) and that a proper connection is made. Alternatively the tubular member may be a composite member comprising, for example, a relatively deformable outer part and a relatively rigid inner part.

However, such deformation of the tubular member by the band whilst the latter is pushed up the taper may be used to advantage in certain applications. One such application is in the connection of deformable substrates such as stranded cables which can be compressed by up to about 20% of their normal volume before the firm connection is made.

The tubular member or the part thereof which contacts the substrate should be made from a material which is compatible with the material of the substrate. For example, it should be galvanically acceptable to the substrate and, preferably, should combine with the material of the substrate to provide galling and thus increase the pull-out strength of the connection.

In the preferred connectors of the present invention the tubular member is made from soft aluminium, which, of course, presents no corrosion problems in the coupling of aluminium pipes, and the metal bands are made from an alloy comprising major proportions of titanium and nickel. Other materials from which the tubular member may advantageously be formed include, for example, the engineering plastics materials mentioned above, soft copper and polyethylene.

It will be appreciated that, in many embodiments of the present invention the "relatively low modulus" of the band (commonly a modulus of elasticity) will lie below the modulus of the material from which the tubular member is made and that the "relatively high modulus" will lie above the modulus of said material. However, in certain applications, the construction of the band and/or the tubular member will be important and it will be further appreciated, therefore, that, in some applications, the construction of the tubular member and/or the band may be more critical to the deformation of the tubular member at the second temperature than the modulus of the material of the band at that temperature. Accordingly the terms "relatively low modulus" and "relatively high modulus" are used herein for convenience to indicate that the strength of the material of the band in its second temperature state is higher than its strength in its first temperature state.

Of course, it will be understood, that in certain applications, the tubular member may itself be made from a material which exhibits a relatively high strength at one temperature and a relatively low strength at a second temperature, i.e. the tubular member may itself be made from a heat-recoverable material.

DETAILED DESCRIPTION OF THE DRAWINGS

Figure 1:
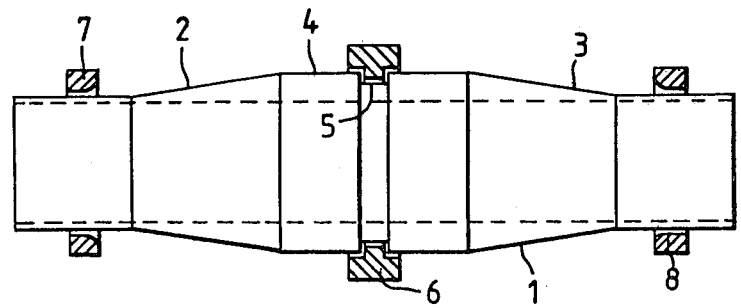
FIG. 1 represents an assembly for use in the present invention.

Referring now to the drawings, in FIG. 1 there is shown a tubular member 1 made from soft aluminium having two tapered portions 2 and 3 and a central portion 4 provided with an annular groove 5 in which there is positioned a split ring 6, also made from soft aluminium. Two rings 7 and 8 are loosely positioned about the ends of the tubular member 1, these bands are made from a nickel-titanium alloy.

Figure 2:
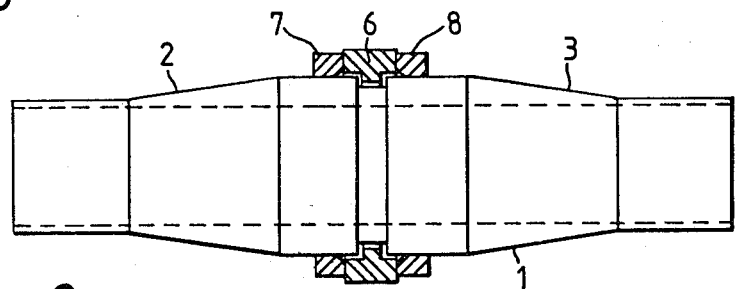
FIG. 2 represents a connector made in accordance with the present invention from the assembly of FIG. 1.

FIG. 2 shows the position after the rings 7 and 8 have been forced up the tapered portions 2 and 3, respectively, so as to expand them, the operation having been carried out in liquid nitrogen so as to bring the nickel-titanium alloy into its weaker, martensitic state. The rings 7 and 8 may be forced up the taper using, for example, a small hydraulic press or a pair of suitably designed tongs. As shown, the rings 7 and 8 abut the central split ring 6 which acts as a locating means for the rings.

Figure 3:
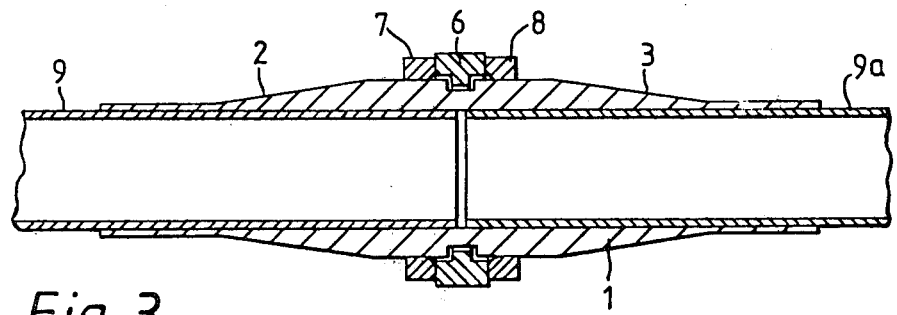
FIG. 3 shows the connector of FIG. 2 in position about two pipes to be connected.
Figure 4:
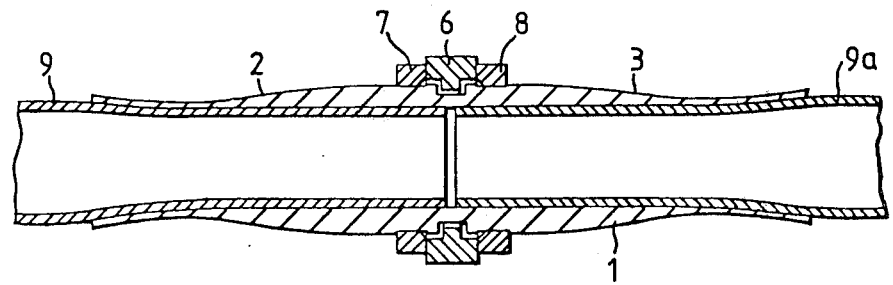
FIG. 4 shows the resulting connection made.

As shown in FIG. 3, two aluminium pipes 9 and 9a are then positioned within the connector. Means may be provided on the inner surface of the connector to assist proper location of the pipes. The assembly shown in FIG. 3 is then allowed to warm whereupon the nickel-titanium alloy assumes its austenitic state and rings 7 and 8 shrink radially to deform the soft aluminium member 1 so that, as shown in FIG. 4, it firmly grips pipes 9 and 9a.

Figure 5:
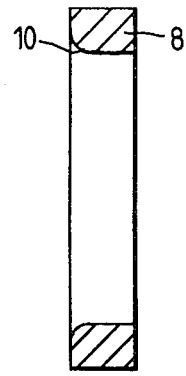
FIG. 5 shows a metal band used in the connector of FIGS. 1 to 4.

FIG. 5 shows, in more detail, metal ring 8. As shown, the ring is provided with a rounded edge 10 to facilitate its movement up the tapered portion 3.

In a typical connector as shown in FIGS. 1 to 4, the angle of taper is 1° 50, corresponding to an outer diameter of about 0.54 inches at the end portions and about 0.58 inches at the central portion. A coupling made with such a connector about soft aluminium pipes having an outer diameter of 0.5 inches lead to a connection which could withstand an internal pressure of up to 2,500 p.s.i. and which had a pull-out strength of about 500 lbs. The connection showed no leakage after being subjected to 500 p.s.i. at 50° C. for one hour. Thus the connection easily met the standards required for irrigation piping.

Figure 6:
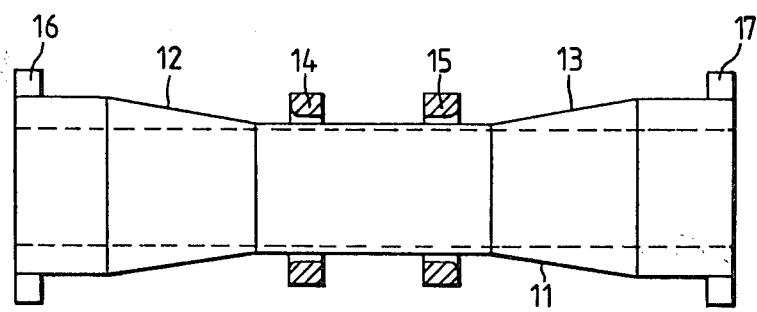
FIG. 6 shows a second assembly for use in the present invention.
Figure 7:
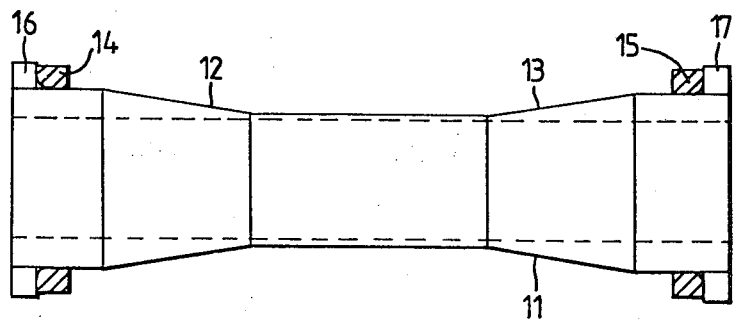
FIG. 7 shows the connector made in accordance with the present invention from the assembly of FIG. 6.
Figure 8:
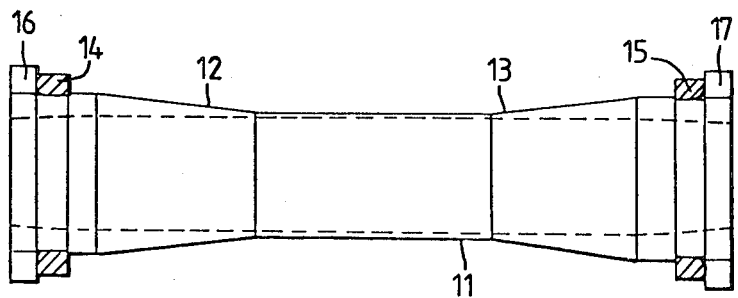
FIG. 8 shows the connector of FIG. 7 after the bands have shrunk.

FIGS. 6 to 8 shows a similar form of connection in which the tapered portions 12 and 13 of the tubular member 11 are reversed so that rings 14 and 15 are expanded by pushing them from an initial central position towards the ends of the tubular member 11 which are provided with annular flanges 16 and 17 to assist proper location of the expanded rings 14 and 15, respectively.

The present invention provides a cheap and effective way of forming connections in low cost, high volume, applications such as domestic central heating by employing the recovery characteristics of two small rings in conjunction with a tubular member which acts both as a mandrel to deform the rings in situ and also as an insert which effectively transmits the recovery forces of the rings to the pipes being coupled. By preconditioning the rings, as described above, it is possible to store and transport the connectors of the present invention to customers without resorting to the use of cryogenic coolants such as liquid nitrogen.

Whilst the present invention has been described with particular reference to the coupling of tubular substrates such as pipes, it will be appreciated that it could equally well be used to connect, for example, rods and flat strips, for example to make electrical connections. Equally, it will be appreciated that, whilst the tubular member of the connector has been described and illustrated herein as being a simple one-part member, it could be formed as a composite member comprising, for example, a hollow generally cylindrical part and at least one cooperating tapered part (in which case the tapered part(s) could be removed and, if desired, reused). Other variations and modifications falling within the scope of the present invention will be apparent to those skilled in the art.

We claim:

1. A connector, having a bore therethrough, which comprises a circumferentially continuous, tubular member having a first portion of a greater external diameter and a second portion of a lesser external diameter, than said first portion at least a portion of the tubular member having an elongated tapered outer surface extending between said first and second portions, and, positioned about said tubular member away from the second portion, a band that is relatively narrow compared to the length of the elongated tapered outer surface, the band being made from a memory metal which exhibits a relatively low modulus of elasticity at a first temperature and a relatively high modulus of elasticity at a second temperature higher than the first temperature, the band having been expanded solely by being forced at the first temperature along and against the taper so as to expand the band, the relatively high modulus of elasticity of the material of the band being such that when the band is brought to said second temperature, it contracts and deforms the tubular member.

2. A connector as claimed in claim 1, wherein both ends of the tubular member are externally tapered and a band is provided at each of said ends.

3. A connector as claimed in claim 2, wherein the ends of said tubular member taper from a central region having the greater external diameter to a terminal region of lesser external diameter.

4. A connector as claimed in claim 2, wherein the ends of said tubular member taper from a central region of lesser external diameter to a terminal region having the greater external diameter.

5. A connector as claimed in claim 1, wherein the tubular member is provided with means for facilitating proper positioning of the band.

6. A connector as claimed in claim 5, wherein said means comprises a shoulder formed on the external surface of the tubular member.

7. A connector as claimed in claim 5, wherein a separate positioning member is provided on the external surface of the tubular member.

8. A connector as claimed in claim 7, wherein the separate positioning member engages a groove on the external surface of the tubular member.

9. A connector as claimed in claim 7 wherein the separate positioning member engages a protuberance on the external surface of the tubular member.

10. A connector as claimed in claim 1, wherein the band is a continuous ring.

11. A connector as claimed in claim 1, wherein the inner surface of the band is contoured to facilitate its movement up the taper.

12. A connector as claimed in claim 1, wherein the angle of the tapered portion is not greater than 5°.

13. A connector as claimed in claim 12, wherein the angle of the tapered portion is from 1° to 2°.

14. A connector as claimed in claim 1, wherein the memory metal is an alloy of nickel and titanium.

15. A connector as claimed in claim 1, wherein the memory metal is a brass.

16. A connector as claimed in claim 1, wherein the memory metal has been preconditioned.

* * * * *